United States Patent
Motomochi (10) Patent No.: US 10,279,767 B2
(45) Date of Patent: May 7, 2019

(54) AIRBAG DEVICE

(71) Applicant: JOYSON SAFETY SYSTEMS JAPAN K.K., Tokyo (JP)

(72) Inventor: Akihiro Motomochi, Tokyo (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 0 days.

(21) Appl. No.: 15/555,372

(22) PCT Filed: Nov. 17, 2015

(86) PCT No.: PCT/JP2015/082218
§ 371 (c)(1),
(2) Date: Sep. 1, 2017

(87) PCT Pub. No.: WO2016/143196
PCT Pub. Date: Sep. 15, 2016

(65) Prior Publication Data
US 2018/0037184 A1    Feb. 8, 2018

(30) Foreign Application Priority Data

Mar. 12, 2015  (JP) .................................. 2015-049588

(51) Int. Cl.
*B60R 21/201* (2011.01)
*B60R 21/205* (2011.01)
(Continued)

(52) U.S. Cl.
CPC .......... *B60R 21/201* (2013.01); *B60R 21/205* (2013.01); *B60R 21/233* (2013.01); *B60R 21/237* (2013.01); *B60R 2021/23308* (2013.01)

(58) Field of Classification Search
CPC ... B60R 21/201; B60R 21/205; B60R 21/233; B60R 21/237; B60R 2021/23308
See application file for complete search history.

(56) References Cited

U.S. PATENT DOCUMENTS

2005/0263995 A1   12/2005  Matsui et al.
2009/0295135 A1   12/2009  Kumagai et al.
(Continued)

FOREIGN PATENT DOCUMENTS

| JP | 2006-278559 | 10/1994 |
| JP | A-H6-278559 | 10/1994 |

(Continued)

OTHER PUBLICATIONS

International Search report Issued in International Patent Application No. PCT/JP2015/082218 dated Dec. 15, 2015.

*Primary Examiner* — Drew J Brown
(74) *Attorney, Agent, or Firm* — Foley & Lardner LLP (57) ABSTRACT

Provided is an airbag device in which heights of folded bodies of an airbag covered with a protector cloth are different at parts. An airbag device includes a retainer in which an airbag and inflators are mounted; and a protector cloth which covers folded bodies of the airbag. The retainer has first to fourth lateral side portions. The protector cloth has a first area which covers a left half side folded body and a second area which covers a right half side folded body. One ends and other ends of the first area and the second area are engaged by bolts, respectively. A slit is provided between the first area and the second area. A length from the one end of the first area to the other end is shorter than a length from the one end of the second area to the other end.

7 Claims, 9 Drawing Sheets

(51) Int. Cl.
*B60R 21/233* (2006.01)
*B60R 21/237* (2006.01)

(56) References Cited

U.S. PATENT DOCUMENTS

| | | | |
|---|---|---|---|
| 2015/0343986 A1* | 12/2015 | Schneider | B60R 21/205 |
| | | | 280/729 |
| 2016/0159311 A1* | 6/2016 | Yamada | B60R 21/233 |
| | | | 280/729 |
| 2017/0028954 A1* | 2/2017 | Sumiya | B60R 21/205 |

FOREIGN PATENT DOCUMENTS

| | | |
|---|---|---|
| JP | 2010-071920 | 3/1998 |
| JP | A-H10-071920 | 3/1998 |
| JP | 2004-142591 | 5/2004 |
| JP | 2004-299654 | 10/2004 |
| JP | 2005-082021 | 3/2005 |
| JP | 2005-335652 | 12/2005 |
| JP | 2008-213513 | 9/2008 |
| JP | 2009-286340 | 12/2009 |
| JP | 2010-162945 | 7/2010 |
| JP | 2014-008850 | 1/2014 |

\* cited by examiner

FIG. 12 under 35 USC 371 to International Patent Application number PCT/JP2015/082218, filed Nov. 17, 2015, which claims priority to Japanese Patent Application No. JP2015-049588, filed Mar. 12, 2015. The contents of these applications are hereby incorporated by reference in their entireties.

TECHNICAL FIELD

The present invention relates to an airbag device which protects a vehicle occupant at the time of collision and the like, and particularly to an airbag device in which a folded airbag is assembled in a state where the shape thereof is retained by a protector cloth.

BACKGROUND ART

Generally, an airbag device which is an occupant protection device in a vehicle and the like includes a folded airbag, an inflator which supplies a gas to the airbag, a retainer which supports the airbag and the inflator, and a protector cloth which holds a folded shape of the airbag (for example, see Patent Literature 1).

In order to improve a performance of restraining an occupant, there is known an airbag device in which an airbag has an asymmetrical shape in consideration of a curved shape of a windshield (for example, see Patent Literatures 2 to 5).

When such an asymmetrical-shaped airbag is folded, a height (thickness) is different horizontally. However, in a state where the protector cloth is covered, the heights of the folded bodies of the airbag become consistent by a spontaneous restoring force of the airbag from the folded state, and the heights are adjusted to the higher side.

CITATION LIST

Patent Literature

[Patent Literature 1]: Japanese Unexamined Patent Application Publication No. 2005-82021
[Patent Literature 2]: Japanese Unexamined Patent Application Publication No. 2010-162945
[Patent Literature 3]: Japanese Unexamined Patent Application Publication No. 2005-335652
[Patent Literature 4]: Japanese Unexamined Patent Application Publication No. 10-71920
[Patent Literature 5]: Japanese Unexamined Patent Application Publication No. 6-278559

As described above, in the related art, when the airbag is covered with one sheet of the protector cloth, the heights of the folded bodies of the airbag cannot be changed at parts.

SUMMARY OF INVENTION

The present invention has been made in consideration of the above conventional situation, and an object thereof is to provide an airbag device in which heights of folded bodies of an airbag covered with a protector cloth are different at parts.

An airbag device of the present invention includes: a folded airbag; an inflator which inflates the airbag; a retainer in which the airbag and the inflator are mounted; and a protector cloth which covers folded bodies of the airbag, and retains a folded shape of the airbag. The retainer has first and second lateral side portions which face each other, and third and fourth lateral side portions which are directed to intersect with the first and second lateral side portions. The protector cloth extends from a first lateral side portion side to a second lateral side portion side to cover the folded bodies of the airbag. The protector cloth has a first area which covers a third lateral side portion side of the folded bodies of the airbag and a second area which covers a fourth lateral side portion side. One end and another end of each of the first area and the second area are engaged by an engaging member. A slit which extends from the one end to a middle in a direction connecting the one end and the other end is provided between the first area and the second area. A length from the one end of the first area to the other end is shorter than a length from the one end of the second area to the other end.

In the airbag device according to one aspect of the present invention, in the airbag, an inflated shape on the third lateral side portion side is asymmetrical with an inflated shape on the fourth lateral side portion side.

In the airbag device according to the aspect of the present invention, among the folded bodies of the airbag, a package volume of a portion covered with the first area is smaller than a package volume of a portion covered with the second area.

In the airbag device according to the aspect of the present invention, a first insertion port is provided on the third lateral side portion side of the retainer, and a second insertion port is provided on the fourth lateral side portion side. Front head sides of the inflators are inserted into the folded bodies of the airbag through the first insertion port and the second insertion port, respectively.

In the airbag device according to the aspect of the present invention, the engaging member is a bolt which fixes the airbag in the retainer together with the inflator. A hole provided in each of the one end and the other end of the first area of the protector cloth is hooked and inserted by the bolt.

In the airbag device according to the aspect of the present invention, an inflator opening is provided in the airbag. A pressing ring which presses a peripheral edge of the inflator opening from an interior of the airbag is arranged. The bolt stands on the pressing ring.

In the airbag device according to the aspect of the present invention, at least four bolts stand from the pressing ring, the two bolts thereamong are positioned on the first lateral side portion side, and the other two bolts are positioned on the second lateral side portion side.

Advantageous Effects of the Invention

According to the present invention, the one end and the other end of each of the first area and the second area of the protector cloth are engaged by the engaging member. The first area covers one side (the third lateral side portion side of the retainer) of the folded bodies of the airbag, and the second area covers the other side (the fourth lateral side portion side of the retainer) of the folded bodies of the airbag, so as to retain the folded shape. The length from the one end of the first area of the protector cloth to the other end becomes shorter than the length from the one end of the second area to the other end. The slit which extends from the one end to the middle in the direction connecting the one end and the other end is provided between the first area and the second area. For this reason, among the folded bodies of the airbag, the height of the portion covered with the first area of the protector cloth can be lower than the portion covered with the second area.

The airbag device of the present invention is properly applied to a case where the inflated shape of the airbag on the third lateral side portion side is asymmetrical with the inflated shape on the fourth lateral side portion side.

The airbag device of the present invention is properly applied to a case where, among the folded bodies of the airbag, the package volume of the portion covered with the first area is smaller than the package volume of the portion covered with the second area.

In the airbag device according to the aspect of the present invention, the first insertion port is provided on the third lateral side portion side of the retainer, and the second insertion port is provided on the fourth lateral side portion side. The front head sides of first and second inflators are inserted into the folded bodies of the airbag through the first insertion port and the second insertion port, respectively. The protector cloth can be simply engaged when the holes, which are provided respectively in the one ends and the other ends of the first area and the second area of the protector cloth, are hooked and inserted by the bolts which fix the airbag in the retainer together with the inflator.

DESCRIPTION OF EMBODIMENTS

Figure 1A:
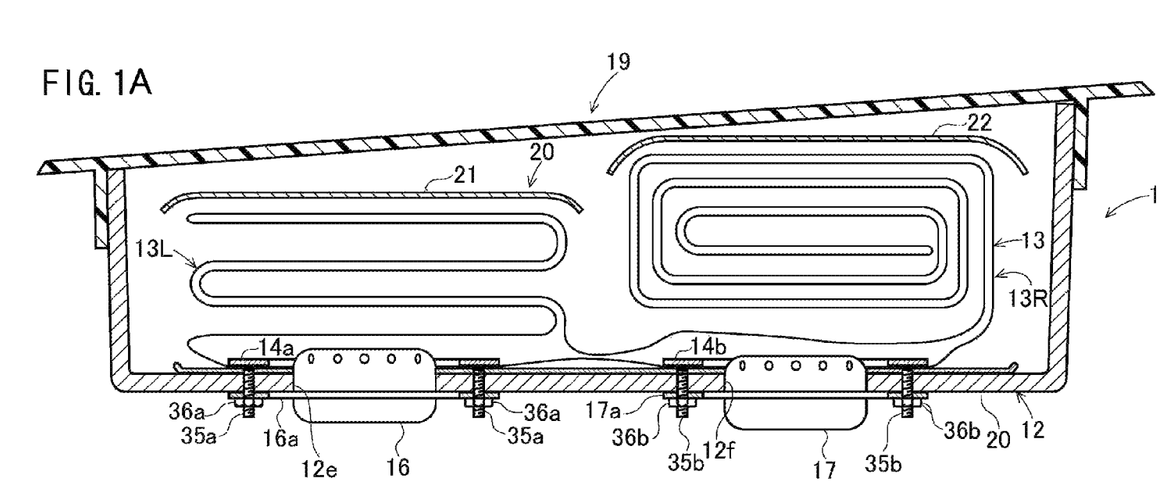
FIG. 1A is a vertical sectional view of an airbag device according to an embodiment.
Figure 1B:
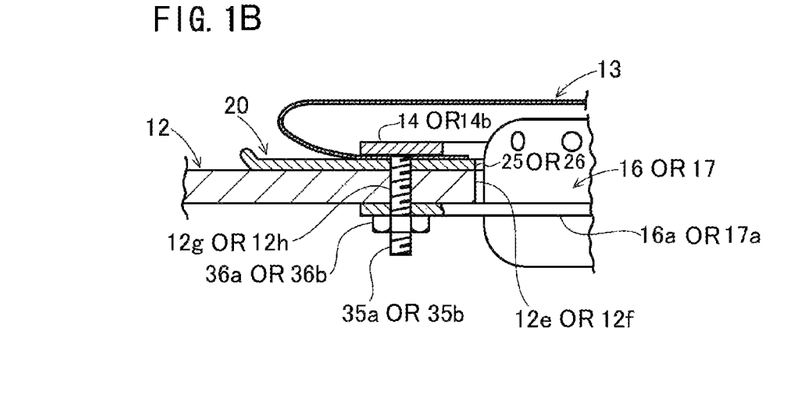
FIG. 1B is a partially enlarged view of FIG. 1A.
Figure 2:
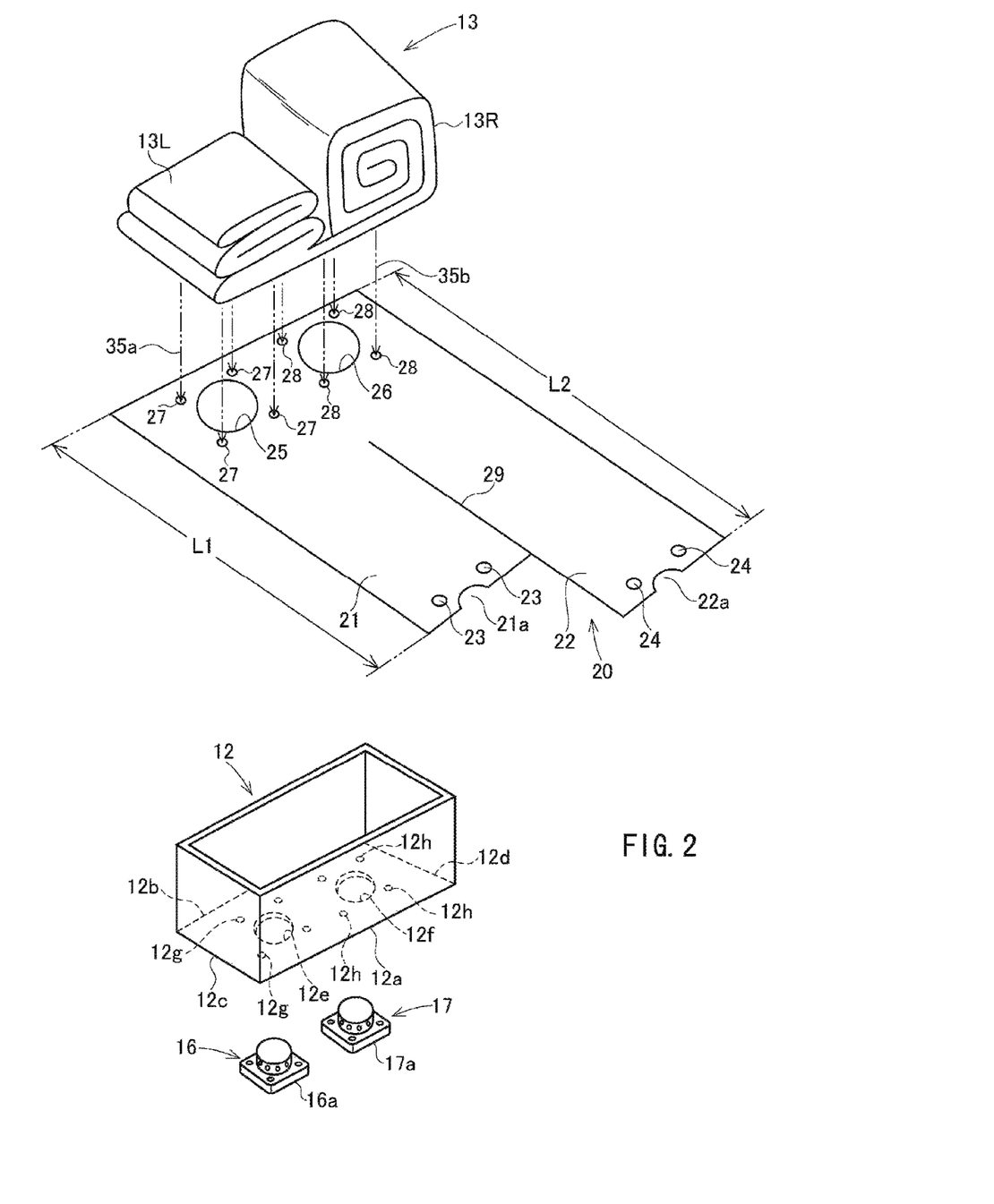
FIG. 2 is an exploded perspective view of folded bodies of the airbag before being covered with a protector cloth according to the embodiment when viewed from above.
Figure 3:
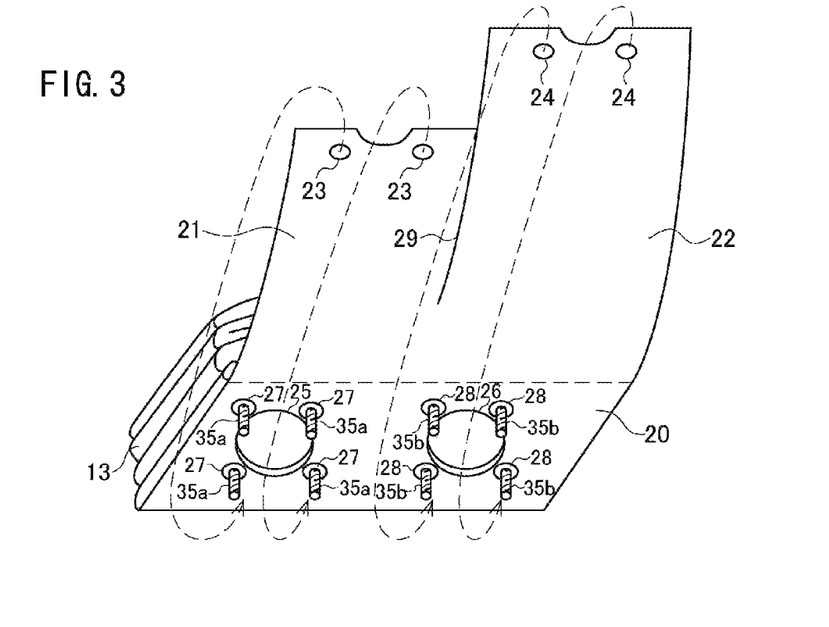
FIG. 3 is a perspective view of the folded bodies of the airbag when being covered with the protector cloth according to the embodiment when viewed from below.
Figure 4:
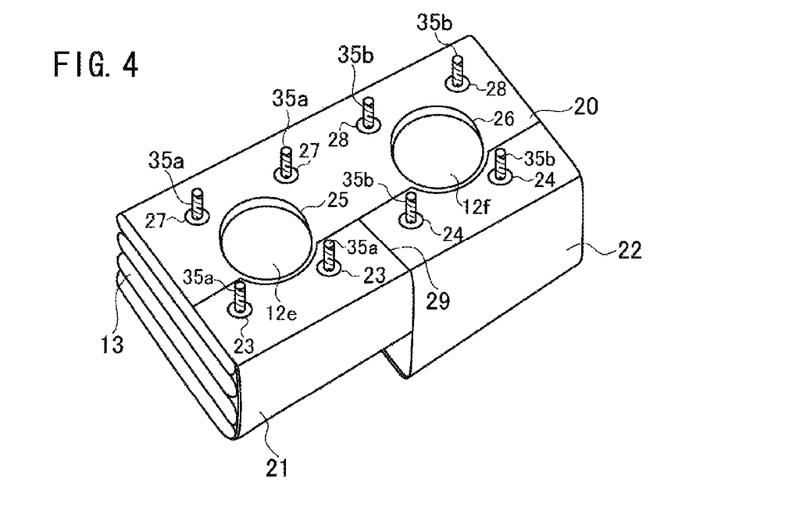
FIG. 4 is a perspective view of the folded bodies of the airbag in the state of being covered with the protector cloth according to the embodiment when viewed from below.
Figure 5A:
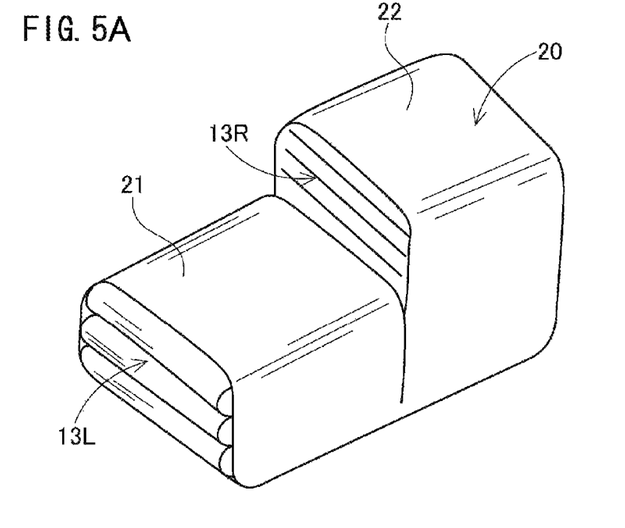
FIG. 5A is a perspective view of the folded bodies of the airbag when being covered with the protector cloth according to the embodiment.
Figure 5B:
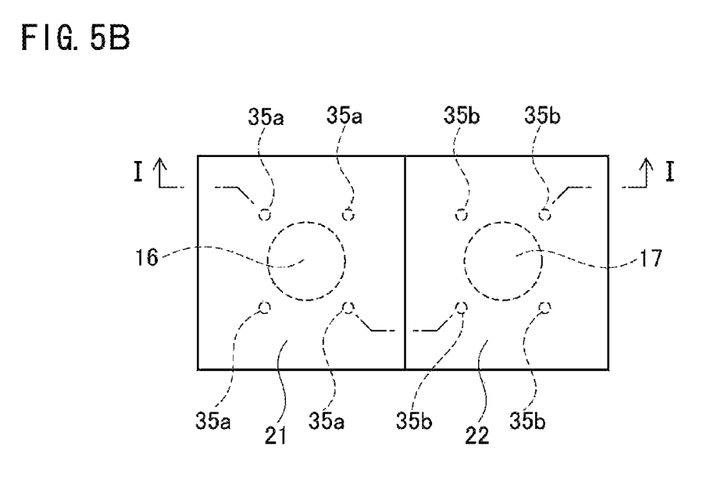
FIG. 5B is a plan view thereof.

Hereinafter, the embodiment of the present invention will be described with reference to the drawings. FIG. 1 is a vertical sectional view of an airbag device according to an embodiment, and FIG. 1A is a sectional view along a position corresponding to I-I line of FIG. 5B. FIG. 2 is a perspective view of folded bodies of the airbag before being covered with a protector cloth when viewed from above. FIG. 3 is a perspective view of the folded bodies of the airbag when being covered with the protector cloth when viewed from below. FIG. 4 is a perspective view of the folded bodies of the airbag in the state of being covered with the protector cloth when viewed from below. FIGS. 5A and 5B are a perspective view and a plan view thereof when viewed from above.

An airbag device 1 includes a retainer 12, an airbag 13 which is mounted in the retainer 12 by pressing rings 14a and 14b, inflators 16 and 17 for inflating the airbag 13, a module cover 19, a protector cloth 20 which retains the shape of the folded airbag 13, and the like. In the embodiment, the airbag device 1 is a passenger seat airbag device which is provided in an instrument panel on a front side of a passenger seat of an automobile. In the airbag 13, a left half side is folded into a folded body 13L which has a small volume (package volume), and a right half side is folded into a folded body 13R which has a large volume (package volume). The folded bodies are covered with the protector cloth 20 so that the shapes thereof are retained.

As illustrated in FIG. 2, the retainer 12 has a substantially rectangular parallelepiped shape of which the upper surface is open. The bottom surface of the retainer 12 has a first lateral side portion 12a and a second lateral side portion 12b which face each other, and a third lateral side portion 12c and a fourth lateral side portion 12d which are directed to intersect with the first lateral side portion 12a and the second lateral side portion 12b. Two inflator insertion ports 12e and 12f are provided in the bottom surface of the retainer 12. The inflator insertion port 12e and the inflator insertion port 12f are arranged such that a line which connects the centers thereof is parallel with the first lateral side portion 12a and the second lateral side portion 12b. The inflator insertion port 12e is positioned on the third lateral side portion 12c side, and the inflator insertion port 12f is positioned on the fourth lateral side portion 12d side.

An insertion hole 12g of a bolt 35a (to be described later) is provided near the inflator insertion port 12e, and an insertion hole 12h of a bolt 35b (to be described later) is provided near the inflator insertion port 12f.

The inflator 16 has a flange 16a. Four bolts 35a standing from the pressing ring 14a pass through the airbag 13, the protector cloth 20, the retainer 12, and the flange 16a, and nuts 36a are fastened therein. Accordingly, the inflator 16 is fixed in the retainer 12 together with the airbag 13.

Similarly, the inflator 17 has a flange 17a. Four bolts 35b standing from the pressing ring 14b pass through the airbag 13, the protector cloth 20, the retainer 12, and the flange 17a, and nuts 36b are fastened therein. Accordingly, the inflator 17 is fixed in the retainer 12 together with the airbag 13.

Among the four bolts 35a standing from the pressing ring 14a, the two bolts 35a are positioned on the first lateral side portion 12a side, and the other two bolts 35a are positioned on the second lateral side portion 12b side. Similarly, among the four bolts 35b standing from the pressing ring 14b, the two bolts 35b are positioned on the first lateral side portion 12a side, and the other two bolts 35b are positioned on the second lateral side portion 12b side.

The airbag 13 is formed in a bag shape by suturing a plurality of sheets of panels. The panel configuring the airbag 13 is formed such that the area on the fourth lateral side portion 12d side is larger than the area on the third lateral side portion 12c side. For this reason, the airbag 13, which is inflated and deployed when the inflators 16 and 17 supply gases, is deployed such that the area on the fourth lateral side portion 12d side is larger than the area on the third lateral side portion 12c side. The inflated shape on the third lateral side portion 12c side is different from the inflated shape on the fourth lateral side portion 12d side.

In the airbag 13, inflator insertion openings are provided on the third lateral side portion 12c side and the fourth lateral side portion 12d side, respectively. The insertion holes of the bolts 35a and 35b are provided therearound.

The pressing rings 14a and 14b are inserted from, the inflator insertion openings of the airbag 13 in the airbag 13, and the bolts 35a and 35b pass through the bolt insertion holes of the airbag 13 and engaging holes 27 and 28 of the protector cloth 20, respectively. Then, the airbag 13 is folded.

In this embodiment, the left half side (third lateral side portion 12c side) of the airbag 13 is folded in a bellow shape into the left half side folded body 13L, and the right half side (fourth lateral side portion 12d side) is folded in a roll shape into the right half side folded body 13R. However, a folding method is not limited particularly thereto, and may be another method such as a method obtained by combining the bellow folding method and the roll folding method.

In the embodiment, in the airbag 13, the area on the right half side is larger than the area on the left half side. Therefore, the right half side folded body 13R has a larger package volume (folded volume) than the left half side folded body 13L, and the height from the bottom surface of the retainer 12 becomes larger.

The protector cloth 20 for covering the folded body of the airbag 13 to retain the shape thereof is made, for example, of a base cloth which is the same material as the airbag 13. The protector cloth 20 has a first area 21 which is belt-shaped and covers the left half side folded body 13L of the airbag 13, and a second area 22 which is belt-shaped and covers the right half side folded body 13R.

A slit 29 which extends from one end of the protector cloth 20 to a middle in a direction connecting the one end and the other end is provided between the first area 21 and the second area 22. For this reason, the tip of the first area 21 and the tip of the second area 22 are divided, and connected each other at the base end of the first area 21 and the base end of the second area 22.

As illustrated in FIG. 2, the two engaging holes 23 into which the bolts 35a are insertable are provided in the tip of the first area 21 in a longitudinal direction, and the insertion opening 25 of the inflator 16 is provided in the base end. The four engaging holes 27 into which the bolts 35a are insertable are provided around the opening 25. In addition, a notch 21a which has a substantially semi-arc shape matching with the shape of the opening 25 is formed in the tip of the first area 21.

The two engaging holes 24 into which the bolts 35b are insertable are provided in the tip of the second area 22 in a longitudinal direction, and the insertion opening 26 of the inflator 17 is provided in the base end. The four engaging holes 28 into which the bolts 35b are insertable are provided around the opening 26. In addition, the notch 22a which has a substantially semi-arc shape matching with the shape of the opening 26 is formed in the tip of the second area 22.

As described above, the folded bodies of the airbag 13 are formed such that the volume of the right half side folded body 13R is larger than the volume of the left half side folded body 13L. For this reason, a length L2 of the second area 22 which covers the right half side folded body 13R is longer than a length L1 from one end of the first area 21 which covers the left half side folded body 13L to the other end.

The airbag 13 is folded as follows. The pressing rings 14a and 14b are inserted in the airbag 13 through the openings 25 and 26, and the bolts 35a and 35b are inserted into the bolt insertion holes of the airbag 13. Next, as illustrated in FIG. 2, the bolts 35a and 35b are inserted into the engaging holes 27 and 28 of the protector cloth 20.

Subsequently, the left half side folded body 13L is formed by bellow-folding the left half side of the airbag 13, the left half side folded body 13L is covered with the first area 21 of the protector cloth 20, and the engaging hole 23 is hooked and inserted by the bolt 35a. In addition, the right half side of the airbag 13 is roll-folded to form the right half side folded body 13R, the right half side folded body 13R is covered with the second area 22, and the engaging hole 24 is hooked and inserted by the bolt 35b. Accordingly, the shapes of the folded bodies of the airbag are retained by the protector cloth 20. Since the slit 29 is formed between the first area 21 and the second area 22, the first area 21 and the second area 22 can individually cover the left half side folded body 13L and the right half side folded body 13R.

In the folded bodies of the airbag, the protector cloth 20 extends from the first lateral side portion 12a side to the second lateral side portion 12b side to cover the folded bodies of the airbag. The engaging holes 23 and 27 of both ends of the first area 21 and the engaging holes 24 and 28 of both ends of the second area 22 are hooked and inserted by the bolts 35a and 35b to be engaged.

As described above, in the folded bodies of the airbag 13, the right half side folded body 13R has a larger thickness than the left half side folded body 13L. In accordance therewith, in the protector cloth 20 which covers the folded bodies of the airbag, the length L2 from one end of the second area 22 to the other end is longer than the length L1 from one end of the first area 21 to the other end. For this reason, the left half side folded body 13L and the right half side folded body 13R can be retained in shape by being covered at respective proper fastening strengths.

The folded bodies of the airbag formed as above are accommodated in the retainer 12, and the bolts 35a and 35b are inserted into the insertion holes 12g and 12h, respectively.

Next, the inflators 16 and 17 are mounted in the retainer 12. The front head side of the inflator 16 is inserted into the folded body of the airbag through the insertion port 12e of the retainer 12 and the opening 25 of the protector cloth. In addition, the front head side of the inflator 17 is inserted into the folded body of the airbag through the insertion port 12f and the opening 26.

The bolts 35a and 35b pass through the flanges 16a and 17a of the inflators 16 and 17 and the bolt insertion holes, and the nuts 36a and 36b are fastened in the bolts 35a and 35b. Accordingly, the airbag 13 and the inflators 16 and 17 are fixed in the retainer 12. When the retainer 12 is covered with the module cover 19, the airbag device 1 is configured as illustrated in FIG. 1.

In the above-configured airbag device 1, the airbag 13 is inflated when the inflators 16 and 17 inject the gases at the time of the collision of the vehicle. At this time, the protector cloth 20 is ruptured, and the airbag 13 presses and opens the module cover 19 so as to be deployed in the interior of the vehicle. Incidentally, a slit for rupturing and opening is preferably provided in the protector cloth.

As described above, in the airbag device, the left half side folded body 13L with a small volume is covered with the short first area 21, and the right half side folded body 13R with a large volume is covered with the long second area 22. Thus, the shapes of the left half side folded body 13L and the right half side folded body 13R can be firmly retained at substantially the same fastening degree by one sheet of protector cloth 20. For this reason, the storage volume of the airbag device can be small, and the airbag can be easily stored in the retainer 12.

Incidentally, the instrument panel of the automobile is provided to be in a high position in the central portion in the width direction of the vehicle body, and to be inclinedly in a low position toward the sides of the vehicle body. In correspondence thereto, the module cover 19 is configured to be inclinedly in a high position in the center side in the width direction of the vehicle body as illustrated in FIG. 1A.

In the embodiment, the height of the top surface of the left half side folded body 13L is lower than that of the top surface of the right half side folded body 13R. Thus, the left half side folded body 13L does not abut on the module cover 19.

Another embodiment will be described with reference to FIGS. 6 to 9.

Figure 6:
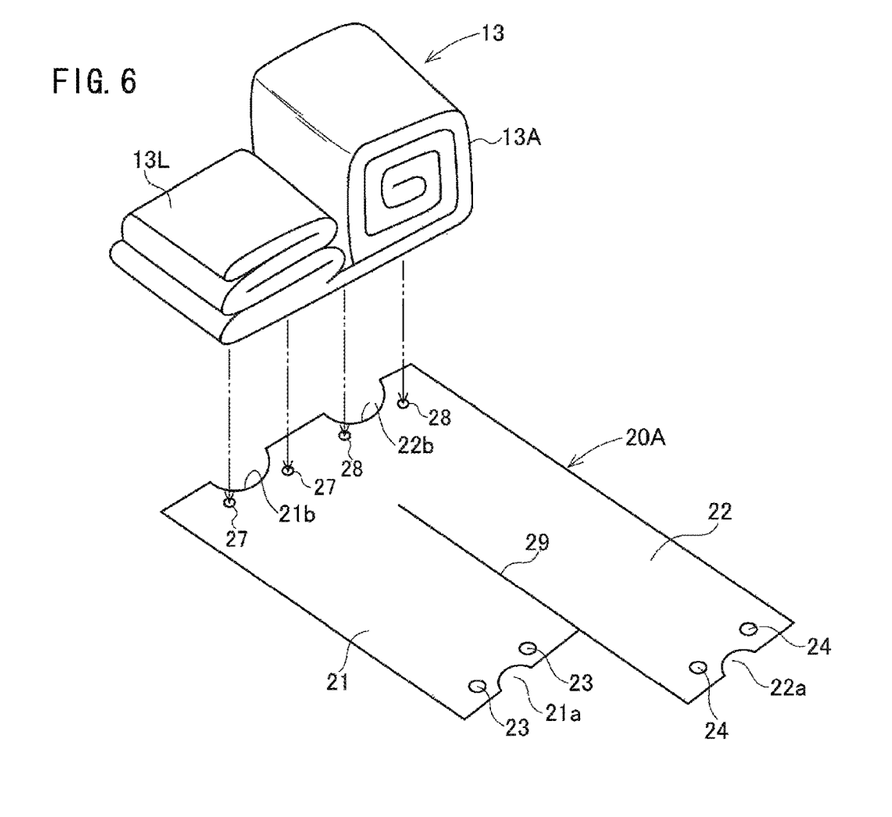
FIG. 6 is a perspective view of the folded bodies of the airbag before being covered with a protector cloth according to a first modification when viewed from above.
Figure 7:
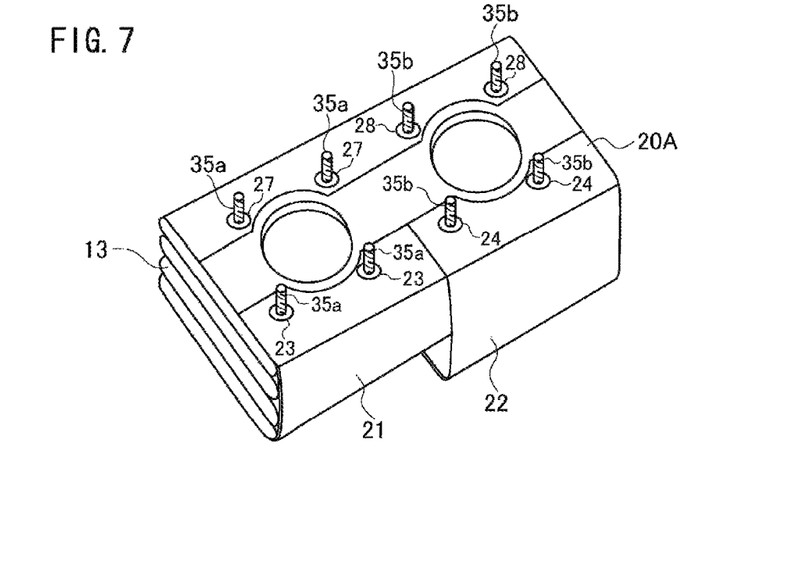
FIG. 7 is a perspective view of the folded bodies of the airbag in the state of being covered with the protector cloth according to the first modification when viewed from below.

In the above-described embodiment, the inflator insertion openings 25 and 26 with the circular shape are provided in the base end of the protector cloth 20. However, as illustrated in FIGS. 6 and 7, a protector cloth 20A may be configured such that the arc shaped notches 21b and 22b are formed in the base ends of the first area 21 and the second area 22, respectively. The two engaging holes 27 and the two engaging holes 28 are provided in the peripheries of the notches 21b and 22b.

In the present invention, in the airbag 13, the third lateral side portion 12c side and the fourth lateral side portion 12d side may have the same inflated shape. In this case, in the panel configuring the airbag 13, the area on the third lateral side portion 12c side is the same as that on the fourth lateral side portion 12d side. When the folded body of such an airbag 13 is covered with the protector cloth 20, the winding force of the first area 21 is larger than the winding force of the second area 22. Accordingly, among the folded bodies of the airbag, the left half side folded body covered with the first area 21 of the protector cloth 20 can have a smaller volume than the right half side folded body covered with the second area 22.

In the airbag 13, although the inflated shape on the third lateral side portion 12c side is the same as that on the fourth lateral side portion 12d side, the thickness of the folded body may be different due to the difference of a folding method or the number of sheets of used clothes (patches). Even in a case where the right half side folded body 13R is thicker than the left half side folded body 13L due to such a difference, the left half side folded body 13L and the right half side folded body 13R can be retained in shape by being covered at respective proper fastening strengths with the protector cloth 20.

Figure 8:
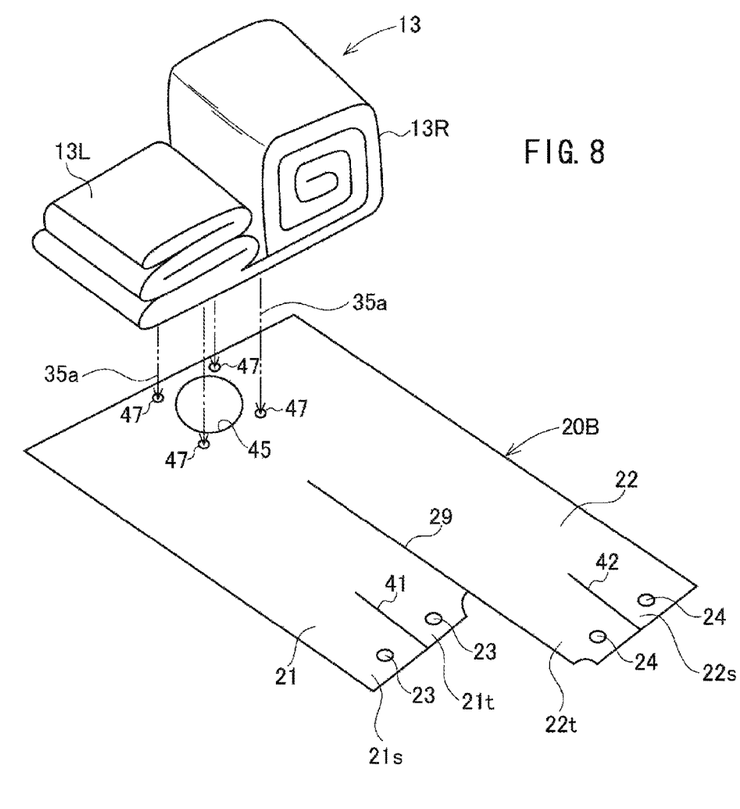
FIG. 8 is a perspective view of the folded bodies of the airbag before being covered with a protector cloth according to a second modification when viewed from above.
Figure 9:
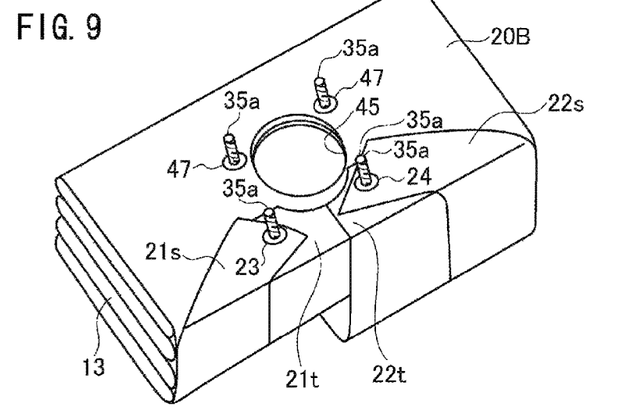
FIG. 9 is a perspective view of the folded bodies of the airbag in the state of being covered with the protector cloth according to the second modification when viewed from below.

The number of the inflators mounted in the airbag device may be one. In this case, as illustrated in FIGS. 8 and 9, one opening 45 (or arc shaped notch) is provided in the central portion of the base end of a protector cloth 20B, and engaging holes 47 into which bolts can be inserted are provided around the opening 45. Slits 41 and 42 which are short and are directed to the base ends are provided in the tips of the first area 21 and the second area 22, respectively, and accordingly, two tongue-shaped pieces 21s and 21t and two tongue-shaped pieces 22s and 22t are formed in the tips of the areas 21 and 22, respectively.

When the airbag 13 is covered in a folded state with the protector cloth 20B, at first, the engaging holes 47 of the protector cloth 20B are hooked and inserted by the bolts 35a, respectively. Subsequently, the airbag 13 is folded to folded the left half side folded body 13L, the left half side folded body 13L of the airbag 13 is covered with the first area 21 of the protector cloth 20B, and the insertion holes 23 of the tongue-shaped pieces 21s and 21t are hooked by one bolt 35a on the left half side. In addition, the right half side folded body 13R is formed, the right half side folded body 13R is covered with the second area 22 of the protector cloth 20B, and the insertion holes 24 of the tongue-shaped pieces 22s and 22t are hooked by one bolt 35a on the right half side.

Figure 10:
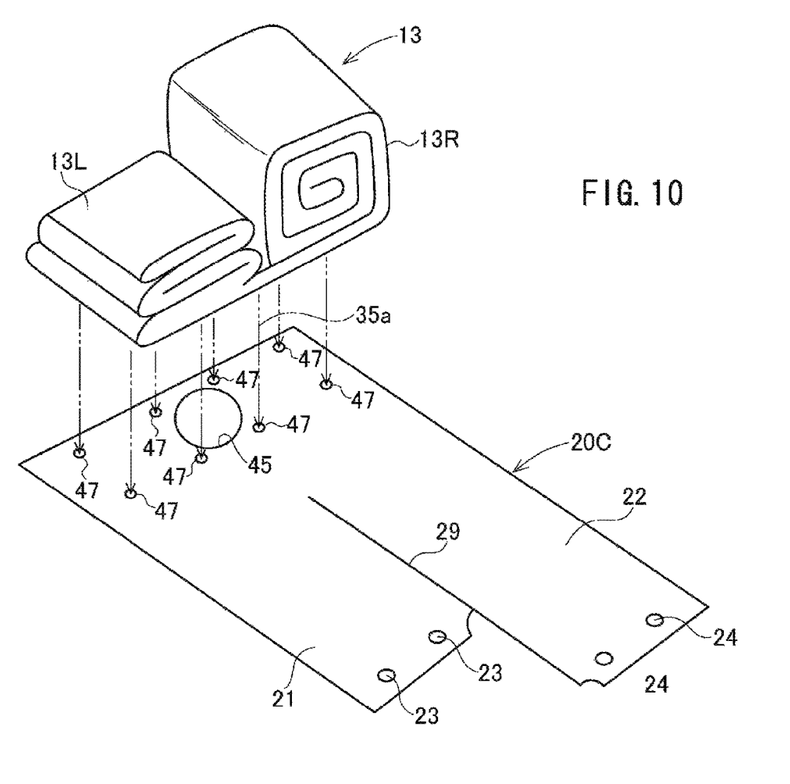
FIG. 10 is a perspective view of the folded bodies of the airbag before being covered with a protector cloth according to a third modification when viewed from above.
Figure 11:
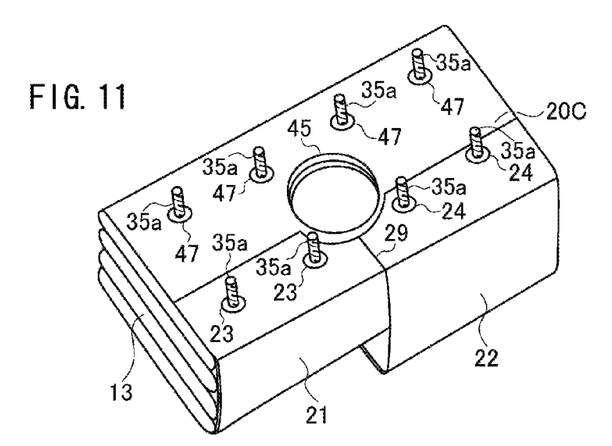
FIG. 11 is a perspective view of the folded bodies of the airbag in the state of being covered with the protector cloth according to the third modification when viewed from below.

FIGS. 8 and 9 illustrate a configuration in which the four bolts 35a stand from the pressing ring, but the number of the bolts is not limited to four. FIGS. 10 and 11 illustrate an example in which the number of the bolts is eight. In this case, a protector cloth 20C has four engaging holes 47 provided around the opening 45, and four engaging holes 47 provided on both end sides from the engaging holes 47 in a transverse direction.

Figure 12:
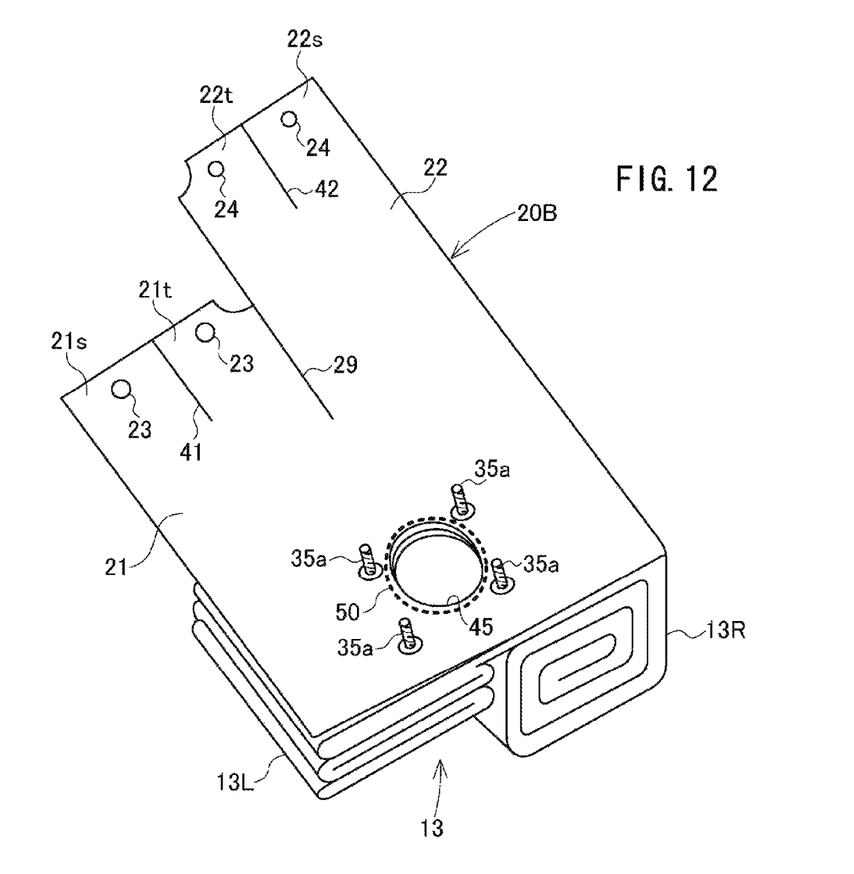
FIG. 12 is a perspective view of the folded bodies of the airbag before being covered with a protector cloth according to a fourth modification when viewed from below.

The protector clothes 20, 20A, 20B, and 20C may be joined with the airbag 13 by sewing. For example, as illustrated in FIG. 12, a sewing portion 50 is formed around the peripheral edge of the opening 45 of the protector cloth 20B and the peripheral edge of the inflator insertion opening of the airbag 13, whereby the protector cloth 20B and the airbag 13 are joined to each other.

In the above-described embodiment, the tip of the first area 21 and the tip of the second area 22 of the protector clothes 20, 20A, 20B, and 20C are divided and the base end of the first area 21 and the base end of the second area 22 are connected. However, the base ends may be also divided such that the first area 21 and the second area 22 are formed as a separate body.

The above description is an example of the present invention, and the present invention may be described in another embodiment. For example, in the above-described embodiment, the airbag device is a passenger seat airbag device, but may be another airbag device.

This application is based upon and claims the benefit of priority from the prior Japanese Patent Application No. 2015-049588 filed on Mar. 12, 2015, the entire contents of which are incorporated herein by reference.

REFERENCE SIGNS LIST

1: airbag device
12: retainer
13: airbag
14a, 14b: pressing ring
16, 17: inflator
20, 20A, 20B, 20C: protector cloth
29: slit
35a, 35b: bolt
36a, 36b: nut

The invention claimed is:
1. An airbag device comprising:
a folded airbag;
an inflator which inflates the airbag;
a retainer in which the airbag and the inflator are mounted; and
a protector cloth which covers folded bodies of the airbag, and retains a folded shape of the airbag, wherein,
the retainer has first and second lateral side portions which face each other, and third and fourth lateral side portions which are directed to intersect with the first and second lateral side portions, the protector cloth extends from a first lateral side portion side to a second lateral side portion side to cover the folded bodies of the airbag, the protector cloth has a first area which covers a third lateral side portion side of the folded bodies of the airbag and a second area which covers a fourth lateral side portion side, one end and the other end of each of the first area and the second area are engaged by an engaging member, a slit which extends from the one end to a middle in a direction connecting the one end and the other end is provided between the first area and the second area, and a length from the one end to the other end of the first area is shorter than a length from the one end to the other end of the second area, a tip of the first area and a tip of the second area are divided, a base end of the first area and a base end of the second area are continuously connected to each other, and, the tip of the first area overlaps the base end of the first area to cover the folded bodies of the airbag, and the tip of the second area overlaps the base end of the second area to cover the folded bodies of the airbag.

2. The airbag device according to claim 1, wherein in the airbag, an inflated shape on the third lateral side portion side is asymmetrical with an inflated shape on the fourth lateral side portion side.

3. The airbag device according to claim 1, wherein among the folded bodies of the airbag, a package volume of a portion covered with the first area is smaller than a package volume of a portion covered with the second area.

4. The airbag device according to claim 1, wherein
a first insertion port is provided on the third lateral side portion side of the retainer, and a second insertion port is provided on the fourth lateral side portion side, and
front head sides of inflators are inserted into the folded bodies of the airbag through the first insertion port and the second insertion port, respectively.

5. The airbag device according to claim 1, wherein
the engaging member is a bolt which fixes the airbag in the retainer together with the inflator, and
a hole provided in each of the one end and the other end of the first area of the protector cloth is hooked and inserted by the bolt.

6. The airbag device according to claim 5, wherein
an inflator opening overlapped with the insertion port is provided in the airbag,
a pressing ring which presses a peripheral edge of the inflator opening from an interior of the airbag is arranged, and
the bolt stands on the pressing ring.

7. The airbag device according to claim 6, wherein
at least four bolts stand from the pressing ring, the two bolts thereamong are positioned on the first lateral side portion side, and the other two bolts are positioned on the second lateral side portion side.

* * * * *